Sept. 7, 1954  S. RUDQUIST  2,688,264
METHOD OF MAKING ROCK DRILLS
Filed Feb. 9, 1950
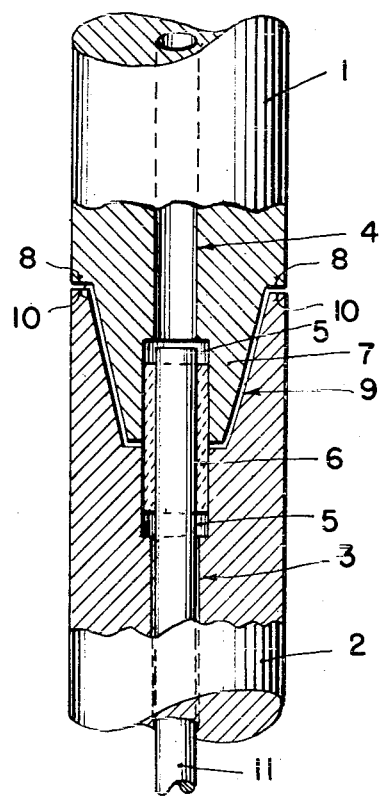
INVENTOR
SVEN RUDQUIST,
BY Vanderwilt, Lind & Ponack
ATTORNEYS Patented Sept. 7, 1954

2,688,264

UNITED STATES PATENT OFFICE 2,688,264

METHOD OF MAKING ROCK DRILLS

Sven Rudquist, Sorgarden, Hallefors, Sweden

Application February 9, 1950, Serial No. 143,219

Claims priority, application Sweden
March 16, 1946

3 Claims. (Cl. 76—108)

This invention relates to new and useful improvements in the manufacture of rock drills and is a continuation-in-part of my co-pending application Serial No. 734,839 filed March 14, 1947, now abandoned.

At the present time rock drills utilized for drilling charge holes for mining and for other blasting purposes are operated by high powered compressed air power plants. In view of the diversified conditions under which such drills are used, the drills are subjected to certain limitations and commensurated therewith the work being performed depends to a large extent on the nature, strength and cutting capacity of the drilling tool.

A present commonly used type of work drill is manufactured from drill steel tubes cut into desired lengths and having formed at one end thereof a bit by forging or other means. The bits of such drills have a relatively short life depending upon the nature of the material in which the drill is used. The drill steel itself, however, generally will last over a considerably longer period of time and therefore the drills have to be edged frequently in order to be effective. Between re-edging of the drills the drill steel will be worn away and only in rare cases does the drill steel break as a result of fatigue. One of the methods used to increase the life of the bits is to provide hard metal tipped bits which can be effected by forging out the material at one end of the drill steel and thereafter annealing the forged portion. The forged out bit is then machined and the flushing passages are drilled. One or more hard metal cutting edges are then brazed on the bit. This, however, entails the disadvantage that it necessitates the use of the same material for the operating part of the drill as is used for the drill bore. Such a procedure is very costly and the utilization of high grade tool steel is extravagent.

Various efforts have been made to overcome such drawbacks in the manufacture of rock drills and it is an object of the present invention to overcome these deficiencies. According to the present invention, the bit and the drilling bore are made separately. The bit is made of a high grade steel whereas the drilling bore can be made of a lower grade steel such, for example, as utilized for construction work. The operating end of the bit is forged out as described above and the flushing passages are thereafter drilled and the hard metal cutting edges are provided by brazing. Thereafter the bit and the drill steel are joined together by resistance flash welding while at the same time the two parts are brought together under a heavy pressure to provide a completely tight and stronger joint. With such a combination the bit will last approximately 100 to 200 times longer than conventional drill bits. It is thus economically possible to make the rock drill of two parts which are subsequently joined by resistance flash welding.

Due to the shorter hardened bit a saving in time will be accomplished in the machining thereof as compared with machining the entire rock drill.

Under the term "electric butt welding," as is well known, one differs between "resistance butt welding" and "resistance flash welding," which arts of welding are of comparatively similar character but involve relatively great differences as regards the final results.

In all butt welding according to the resistance welding method the welding temperature is reached through current heat developed partly in those portions of the work which are disposed between the electrodes or jaws, as a result of the resistance of the material to be electric current, and partly in the contact surfaces, as a result of the contact resistance.

Depending on whether the main part of the welding heat is developed as a result of the resistance of the work and is distributed along the whole of its bracing length, or it is caused by the contact resistance and is concentrated to the contact spots, resistance butt welding or resistance flash welding, respectively, is involved.

This apparently insignificant difference in principles determined by the relative magnitude of the contact resistance, however, involves a very considerable difference in the progress of the two methods as well as in the quality of the welding joints obtained, and notwithstanding the fact that it is frequently possible to carry out both methods in the same machine.

Experiments undertaken have shown that, with the use of the electric resistance butt welding method for joining together the drill steel and the bit it is impossible to obtain a durable rock drill. When, on the other hand, the resistance flash welding method was used for said joining, the inventor succeeded in obtaining an extremely strong joint, which was able to withstand the extraordinarily high mechanical stresses associated with the drilling operation. Thus, an essential feature of the invention lies in the use of the resistance flash welding method for manufacturing rock drills, the drill steel and the bit being joined together under the action of a heavy pressure while the parts are brought together in abutting relation.

Another outstanding feature of the present invention is in the formation of the ends of the two drill members to be joined to effect a stronger joint than has heretofore been attained in prior art devices.

Further objects and features of the invention will be readily apparent from the following detailed description of a single preferred embodiment of the invention when taken together with the accompanying drawing in which the figure is a partial sectional side view of a rock drill according to the present invention.

In the drawing the drill bit is designated as 1 and the drill steel by the numeral 2. In the drill steel 2 there is provided an axially extending flushing passage 3 which in assembled condition of the rock drill is aligned with a corresponding flush passage 4 in the drill bit 1. The flushing passage 4 in the bit may be in a usual manner divided into two branches in proximity to the end of the bit and terminate on either side of a hard metal cutting edge secured by brazing for example to the edge of the bit. The bit 1 and the drill steel 2 can be of any suitable length and as hereinbefore set forth are made of steel suitable for the purpose for which the rock drill is designed.

Provided in the mating ends of the bit 1 and the drill steel 2 there are recesses 5 which are coaxial with the passages 3 and 4. Inserted in these recesses is a tubular sleeve 6 of mica or the like and the overall length of the recesses 5 should slightly exceed the length of the sleeve 6. The end of the bit 1 is provided with a wedge-shaped plug 7 extending on two sides of the bit to the outer surface thereof and lying in a common plane therewith. Shoulders 8 inwardly directed from the outer surface of the bit to the larger part of the wedge 7 are provided and which constitute abutment surfaces for purposes hereinafter to be brought forth. In the mating end of the drill steel 2 a transversely extending recess 9 is made which corresponds in shape and size to the wedge 7 and this recess extends through the drill steel on two sides thereof and is provided with shoulders 10 on the other sides similar to the shoulders 8 on the bit 1.

After the bit 1 and the drill steel 2 have been prepared as shown in the drawing, they are placed in axially aligned relation between the jaws of resistance flash welder in abutting relationship. Before the members 1 and 2 are brought into such relationship the sleeve 6 is inserted into the recess 5. After the bit 1 and the steel 2 have been clamped in the jaws of the resistance flash welder, the electric current is switched on and one of the drill parts, preferably the bit 1, is moved longitudinally back and forth in relation to the part 2. The ends to be joined are thereby strongly heated by the induced and eddy currents therein as well as by arcs if any. When the temperature has reached the desired value, the parts 1 and 2 are powerfully pressed or "struck" together, whereby the oxide layer on the juxtaposed surface on the bit and the drill steel is pressed radially outward. One part of the oxide layer will disappear in the form of a shower of sparks but another portion thereof will form a circumferential ridge around the joint which is extremely strong. This ridge subsequently is ground away after the joint has become cool.

Due to the construction of the mating ends as a wedge-shaped plug and a transversely extending recess, the flashings are not prevented from escaping from the point of junction when the bit is welded to the drill bar or drill steel since the flashings will normally be flying in the longitudinal direction of the recess and therefore there is extremely little possibility that any oxides of the metal will remain in the contact surface of the joint. Another advantage obtained by means of the shaping of the mating ends as hereinbefore described is that a relatively large contact surface is obtained thereby securing a stronger joint than has heretofore been utilized by means of different shapings of the mating ends. It is to be noted that the oxides of the metal can escape from a transversely extending recess much more easily than from other types of recesses or formations such as cylindrical having no openings to the outside of the drill bar. In addition due to the wedge shaped mating portions there is a greater tenacity between the two portions in the longitudinal direction of the rock drill due to the large area of junction and a much greater strength of torsion is obtained which is very important in rock drills which are often exposed to high torsion stress especially when during the drill operation the drill gets stuck in the rock.

During the pressing operation, namely the pressing of the parts 1 and 2 together, the sleeve 6 will be somewhat compressed, but nevertheless will prevent the fused steel at the joint from obstructing the passages 3, 4. After cooling the joint, the mica sleeve 6 may, if desired, be blown out by means of compressed air.

In order to prevent too great a compression of the mica sleeve 6, a wire or rod 11 can be introduced into the passage 3 of the drill steel 2 and the inner end of this rod 11 will pass through the sleeve 6. This rod may comprise, for example, a steel or copper wire. After the completion of the welding operation, the wire 11 is then withdrawn. As pointed out above, it may or may not be necessary to remove the mica sleeve 6 after the welding operation and if desirable this sleeve may be a quartz tube or may be made of ceramic or other refractory material. It is not necessary that the sleeve be tubular since it may be solid as well. If a solid sleeve is used, it is possible after the welding operation has been completed to push it out through either of the passages 3 or 4 by means of a rod or wire if necessary after having first crushed the same.

Heretofore various methods of joining the bit to the drill bar have been utilized but the opinion was prevalent that a weld junction between two different types of steel material subjected to vibrations and strokes would have a short useful life. It has now been found that the only method for obtaining a considerable life length and the best conditions is by means of the flash welding method utilized in the present invention.

While only a single embodiment of the present invention has been hereinbefore set forth, it is to be understood that various modifications can be made therein without departing from the scope of the present invention as defined in the appended claims.

I claim:
1. The method of manufacturing metal rock drills having a bit and a drill bar secured thereto comprising forming a wedge-shaped end portion on one of the mating ends and a corresponding wedge-shaped recess in the mating end of the other member, said wedge-shaped end portion and wedge-shaped recess extending transversely through said bit and said drill bar, and forming flat plane mating surfaces, providing aligned axially extending flushing passages in the bit and drill bar, inserting a sleeve of refractory material having an internal diameter substantially equal to that of the passages in the adjacent ends of the passages in said bit and bar, inserting the wedge-shaped end in said wedge-shaped recess and abutting said flat plane mating surfaces and joining said bit and said bar by means of resistance flash welding while pressing the parts strongly together and aligning the passages in said bar with the passage in said bit to form a completely tight and strong joint.

2. A method of manufacturing metal rock drills as claimed in claim 1 including forming corresponding axial recesses in the adjacent ends of said flushing passages, inserting said refractory sleeve in said recesses and further comprising inserting a rod through one of said flushing passages into said refractory sleeve prior to welding said bit and said drill bar together and removing said rod after the welding operation.

3. A method of manufacturing metal rock drills as claimed in claim 1, and truncating said wedge-shaped end portion and said wedge-shaped recess whereby in addition to having flat plane mating surfaces there are provided flat plane end abutting surfaces thereon, the transverse ends of said end portion and said recess corresponding to the peripheral surface of said bit and said drill bar.

References Cited in the file of this patent

UNITED STATES PATENTS

| Number | Name | Date |
| --- | --- | --- |
| 171,245 | Sage | Dec. 21, 1875 |
| 348,823 | Black | Sept. 7, 1886 |
| 402,107 | Ries | Apr. 23, 1889 |
| 1,154,933 | Peiseler | Sept. 28, 1915 |
| 1,326,643 | Burns | Dec. 30, 1919 |
| 1,522,195 | Lemp | Jan. 6, 1926 |
| 1,990,077 | Kershaw | Feb. 5, 1935 |
| 2,173,109 | Hamblin | Sept. 19, 1939 |
| 2,211,173 | Shaffer | Aug. 13, 1940 |
| 2,267,868 | Laval et al. | Dec. 30, 1941 |
| 2,374,763 | Martin | May 1, 1945 |